United States Patent [19]

Cretzler

[11] 4,064,549

[45] Dec. 20, 1977

[54] CYLINDRICAL CAPACITIVE QUARTZ TRANSDUCER

[75] Inventor: Donald J. Cretzler, San Diego, Calif.

[73] Assignee: Metrolology General Corporation, San Diego, Calif.

[21] Appl. No.: 719,189

[22] Filed: Aug. 31, 1976

[51] Int. Cl.² ............................................... H01G 7/00
[52] U.S. Cl. ................................... 361/283; 73/398 C
[58] Field of Search ...................... 317/246; 73/398 C; 324/61 P; 361/283

[56] References Cited

U.S. PATENT DOCUMENTS

| 3,405,559 | 10/1968 | Moffatt | 317/246 |
| 3,750,476 | 8/1973 | Brown | 73/398 C |
| 3,859,575 | 1/1975 | Lee | 317/246 |

*Primary Examiner*—E. A. Goldberg
*Attorney, Agent, or Firm*—Ellsworth R. Roston

[57] ABSTRACT

A cylindrical transducer is defined by a pair of concentric members formed from a suitable material such as quartz and fused at their ends and separated from each other by a relatively small distance along an intermediate portion of their axial lengths. Thin layers of an electrically conductive material are provided on the adjacent surfaces of the concentric members along the intermediate portions of their axial lengths. The outer member is provided with a progressively increasing thickness near the axial ends of the member. The thickness of the outer member increases with progressive positions towards the axial ends to prevent the member from cracking when subjected to stresses.

The thin conductive layers on the members are formed by plating a thin layer of a noble metal such as platinum on the annular surfaces of the quartz members and then applying heat to the quartz members at a particular temperature such as approximately 1050° C. for a particular period of time such as approximately 15 minutes. This process is repeated several times with successive thin layers of the noble metal to provide a fusion of the platinum to the quartz and to provide a progressive change from platinum silicide at the surface of the quartz to platinum at the exposed surface of the conductive layer.

6 Claims, 4 Drawing Figures

CYLINDRICAL CAPACITIVE QUARTZ TRANSDUCER

This invention relates to cylindrical transducers defined by a pair of concentric members. More particularly, this invention relates to cylindrical transducers which are constructed in a manner to minimize cracking when the external one of the concentric members is subjected to pressure to vary the characteristics of the transducer.

Cylindrical transducers are in great demand for use in certain applications. In a cylindrical transducer, a pair of dielectric members are disposed in a concentric relationship. One of the concentric members has an inner annular surface which is disposed in contiguous relationship to an outer annular surface on the other member. Each of these surfaces is coated with a thin layer of a conductive material to define a pair of electrically conductive surfaces which are disposed in spaced but contiguous relationship to each other. As pressure is applied to the external member, the distance between the conductive layers on the two members varies so as to vary the characteristics of the transducer. When the transducer operates as a capacitor, the conductive surfaces define the two plates of the capacitor.

A cylindrical transducer such as described above has certain important advantages. One advantage is that the two conductive surfaces have a closed loop configuration and have a uniform spacing relative to each other about their annular peripheries. This tends to minimize stray capacitive effects between the two conductive surfaces such as are normally produced in capacitors. With the advent of semiconductor circuits, these stray capacitances have had a pronounced effect in preventing reliable systems with predictable characteristics from being produced, particularly when the systems have had to operate at high frequencies. By minimizing stray capacitive effects, the cylindrical transducer has a pronounced advantage over other types of transducers.

It has been difficult in the past to construct satisfactory types of cylindrical transducers. One problem has resulted from the tendency of the outer one of the two concentric members to crack at the position where this member is sealed to the other concentric member. This tendency to crack has been particularly pronounced because pressures have been applied to the outer member to vary the spacing between the two members in accordance with this pressure. As will be appreciated, the capacitance between the two conductive surfaces varies in accordance with the variations in the spacing between the surfaces.

It has also been difficult in the prior art to adhere the conductive coatings to the surfaces of the dielectric members. This has been particularly true when the dielectric material of the two concentric members has been a fused or amorphous quartz. The problem of adhering the conductive layers to the surface of the concentric members has been especially troublesome because the capacitance between the conductive surfaces is affected by the failure of the conductive layers to adhere to the quartz surfaces.

This invention provides a cylindrical transducer which overcomes the above difficulties. In the cylindrical transducer of this invention, any tendency for the outer concentric member to crack upon the imposition of pressure is minimized by progressively increasing the thickness of the member along a distance between an axially intermediate position and the position of the seal between the members. This progressive increase in thickness of the outer member tends to distribute stresses and avoid stress concentration at any one position along the axial length of the member.

In the transducer of this invention, the conductive layers are permanently bonded to the concentric surfaces of the two concentric members. This permanent bonding is obtained by a method in which thin layers of a noble metal such as platinum are individually applied to the surfaces of the concentric members and heat is then applied to each thin conductive layer at a particular temperature for a particular period of time before the next thin layer is applied. In this way, platinum silicide is produced at the surfaces of the concentric members and is fused to these surfaces and a gradual transition is produced in the conductive layer between platinum silicide at the positions adjacent to the quartz and platinum at the exposed surfaces of the conductive layers.

Figure 1:
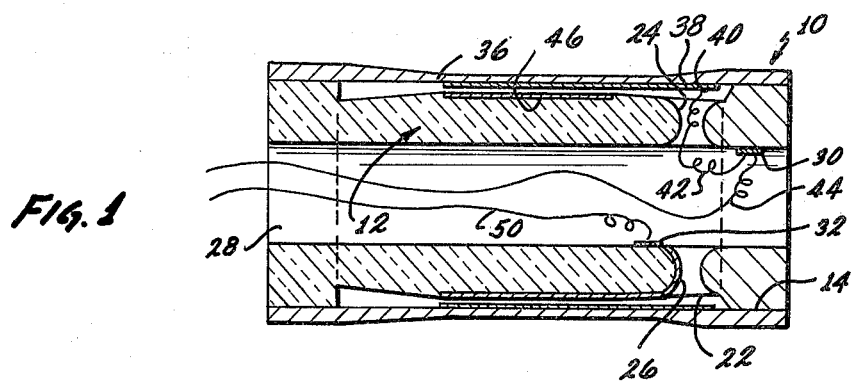
FIG. 1 is a sectional view of a cylindrical transducer constituting one embodiment of the invention.

In the embodiment of the invention shown in the drawings, a pair of concentric members 10 and 12 are provided. Each of the members 10 and 12 is made from an amorphous (or non-crystalline) quartz or a fused quartz. When the members 10 and 12 are made from a fixed quartz, natural quartz crystals are crushed into a fine powder and the powder is fused as by heat and pressure. It will be appreciated, however, that the members 10 and 12 may be made from any suitable material having dielectric properties.

The member 10 is provided with an axial bore 14 having a diameter slightly greater than the external diameter of the member 12. At its two axial ends, the member 10 is provided with a portion 16 having a progressively increasing thickness. This progressive increase in thickness is preferably provided with a relatively shallow slope through an axial distance designated as 18. The external circumference of the member 10 along the axial distance 18 is designated hereafter as the "transition area." As will be seen, the transition area terminates at a position which is axially interior from the axial periphery of the member 10.

In one embodiment of the invention, the member 10 may have an axial length of approximately 4½ inches. In this embodiment, the axial length of the transition area may be approximately 0.64 inch and the transition area may terminate at a distance of approximately 0.60 inch from the axial end of the member. The internal diameter of the member 10 may be approximately 1.03 inches and the external diameter may be approximately 1.10 inches at positions intermediate the two transition areas 18. The external diameter of the member 10 may gradually increase to 1.14 inches in the transition area.

The concentric member 12 may be provided with a diameter slightly less than the diameter of the bore 14 in the member 10. For example, in the embodiment described in the previous paragraph, the concentric member 12 may be provided with a diameter which is approximately four thousandths of an inch less than the diameter of the bore in the member 10.

A diagonal cut at a suitable angle such as approximately 3.3° is provided as at 22 in the member 12. This cut is initiated at a position corresponding substantially to the beginning of the transition area 18 in the member 10 at the interior end of the transition area. The cut terminates at a position corresponding substantially to the end of the transition area 18 in the member 10. The position of the termination of the cut is defined as the position of a "re-entrant seal" since this position defines one boundary of the fusion between the members 10 and 12. The cut 22 is produced to provide an air pocket which serves as a heat transducer when the members 10 and 12 are fused as by heat. The diameter of the member 12 along the axial length extending axially outwardly from the position of the re-entrant signal is slightly greater than the diameter of the member along the intermediate portion of the member. This slightly increased diameter facilitates the fusion between the members 10 and 12.

Figure 2:
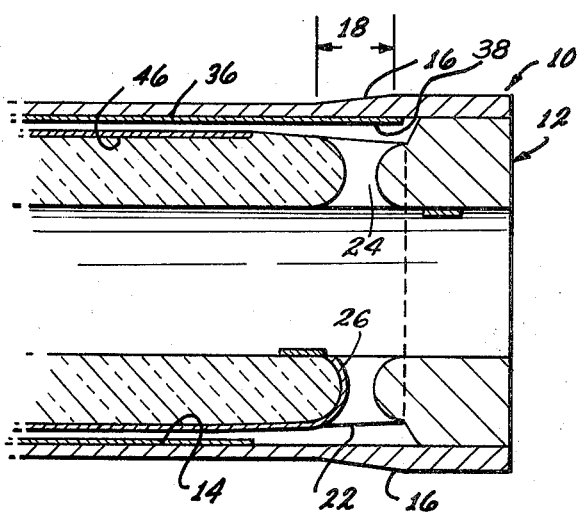
FIG. 2 is an enlarged fragmentary sectional view of the transducer shown in FIG. 1.
Figure 3:
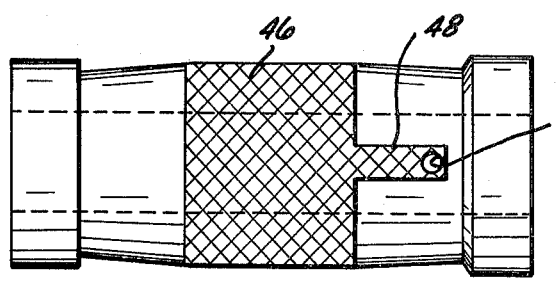
FIG. 3 is an enlarged elevational view showing the member of FIG. 2 with the layer of the electrically conductive material on the member.
Figure 4:
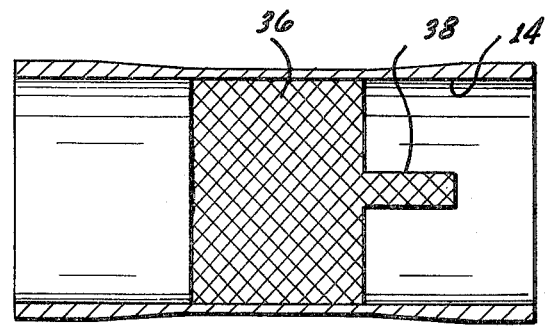
FIG. 4 is an enlarged elevational view of the other concentric member with the layer of the electrically conductive material on the member.

A pair of holes 24 and 26 (FIG. 2) are provided in the member 12 at one end of the member at a position near the end of the cut 22 at that end of the member. The holes 24 and 26 communicate with a bore 28 which extends axially through the member 12. A pad 30 is provided on the concentric wall defining the axial bore 28 and is disposed at a position adjacent the hole 24. Similarly, a pad 32 is provided on the concentric wall defining the axial bore 28 at a position adjacent the hole 26.

A layer 36 of a conductive material such as a noble metal (preferably platinum) is bonded to the internal surface of the member 10 at an intermediate portion of the member between the transition areas 18 at the opposite ends of the member. A tab 38 made from the same material as the conductive layer 36 extends axially from one end of the layer 36 in integral relationship with the layer. The tab 38 is disposed at one end adjacent the hole 24 and a dab 40 of a conductive material is provided on the tab 38 at a position adjacent the hole 24. The dab 40 may be made from an epoxy but silver may be intimately mixed in the epoxy to make it conductive. A lead 42 is connected at one end to the dab 40 of conductive material and at the other end to the pad 30. A lead 44 is then connected at one end to the pad 30 and is led through the axial bore 28 to a position external to the member 12.

Similarly, a conductive layer 46 made from a suitable material such as platinum is provided on the external surface of the member 12. A conductive tab 48 extends integrally from the conductive surface 46 and through the hole 26 to the pad 32. A lead 50 is connected at one end to the pad 32 and is extended through the bore 28 to a position external to the member 10.

The members 10 and 12 are fused at the ends of their axial lengths at a suitable temperature such as approximately 1750° C. When the members 10 and 12 are fused at this elevated temperature, the platinum material on the tabs 38 and 48 adjacent to the position of fusing does not volatize. One reason is that the platinum is firmly bonded to the surface of the quartz members 10 and 12 by a process which is described in detail below so that it cannot volatilize even when subjected to heat. Another reason is that the air in the pockets defined by the cuts 22 acts as a heat insulator to prevent the temperature of the platinum on the tabs 38 and 48 from becoming excessive.

As will be seen, the conductive surfaces 36 and 46 define the two plates of a capacitor. The value of this capacitor may be varied by applying a pressure to the member 10 to squeeze the member radially. This causes the distance between the conductive surfaces 36 and 46 to vary in accordance with the magnitude of the pressure applied.

In the prior art, the application of a pressure to the member 10 has caused stresses, both tensile and compressive, to be produced on the member 10. These stresses have been concentrated at a position corresponding to the end of the transition area 18 and have been instrumental in producing circumferential cracks at these positions.

By providing the member 10 in this invention with a progressively increasing thickness in the transition area 18, any tendency for the member to crack upon the application of pressure against the member has been eliminated as a practical matter. This progressive increase in the thickness of the member 10 in the transition area 18 has provided a distribution of the stresses on the member throughout the transition are and has thereby avoided a stress concentration at any one position, and particularly the position at the end of the transition area. As will be appreciated, the advantages of providing this progressive increase in thickness become enhanced when the slope represented by the progressive increase in thickness is relatively shallow. Actually, within practical limits, the ability of the member 10 to withstand, without cracking, the pressures imposed upon it become enhanced as the slope of this progressive increase in thickness is decreased.

The thin layers 36 and 46 are respectively bonded to the surfaces of the quartz members 10 and 12 by a method which constitutes one of the features of this invention. As a first step in the method, a suitable thickness such as approximately 5 millionths of an inch may be deposited on the surfaces of the members as by vacuum deposition in an argon atmosphere. The quartz members are then heated at a particular temperature such as approximately 1050° C. for a suitable period of time such as approximately 15 minutes. The application of this heat at a temperature in excess of approximately 900° C. causes the platinum to tend to become converted to platinum silicide in the vicinity of the quartz. By converting the platinum to platinum silicide, an affinity tends to be created between the quartz and the platinum.

Successive layers of platinum are applied to the previously deposited layers and are heated in a manner similar to that described above. For example, six layers of platinum, each of a thickness of approximately 5 millions of an inch, may be applied in sequence to the quartz and then heated in a manner similar to that described above. In this way, a layer of metal with a total thickness of approximately 30 millions of an inch is produced. By producing the layer of metal in this manner, a gradual transition is provided from platinum silicide at the surface of the quartz to substantially pure platinum at the exposed surface of the metal is produced. This gradual transition provides, as a practical matter, for the fusion of the platinum to the quartz.

Although this application has been disclosed and illustrated with reference to particular applications, the principals involved are susceptible of numerous other applications which will be apparent to persons skilled in the art. The invention is, therefore, to be limited only as indicated by the scope of the appended claims.

I claim:

1. In combination in a transducer,
    a first cylindrical member made from quartz and provided with a hollow interior and with an inner surface defining the hollow interior,
    a second cylindrical member made from quartz and disposed within the first cylinder and having a surface in closely spaced relationship to the first cylinder member,
    a first conductive layer on the internal surface of the first cylindrical member,
    a second conductive layer on the external surface of the second cylindrical member,
    the first and second member being fused along their peripheries at positions displaced from the first and second conductive layers, and
    the first cylindrical member being provided with a progressively increased thickness at progressively displaced positions from the first and second conductive layers.

2. The combination set forth in claim 1 wherein
    the first and second cylindrical members are provided with a re-entrant seal,
    and wherein the progressive increase in the thickness of the first cylindrical member occurs to an axial position corresponding substantially to the position of the re-entrant seal.

3. In combination in a transducer,
    a first cylindrical member made from quartz and having a particular axial length and having an axial bore and having at each end a progressively increasing thickness,
    there being a thin layer of a conductive material around the surface defining the axial bore along an intermediate portion of the axial length of the first cylindrical member,
    a second cylindrical member made from quartz and having the particular axial length and having a radius for disposition within the axial bore of the first cylindrical member,
    the second cylindrical member having a greater radius at its ends than at its intermediate portion and having at its intermediate portion a radius slightly less than the radius of the axial bore in the first cylindrical member to provide a spacing between the first and second cylindrical members along the intermediate portion of the first and second cylindrical members,
    there being a thin layer of a conductive material around the surface of the second cylindrical member along the intermediate portion of the axial length of the second cylindrical member,
    the first and second cylindrical members being fused at each axial end.

4. The combination set forth in claim 3 wherein
    the first and second cylindrical members are provided with re-entrant seals at positions near the ends of the members, and
    wherein the progressive thickness in the first cylindrical member at the ends of the first cylindrical member terminates at substantially the positions of the re-entrant seals.

5. The combination set forth in claim 4 wherein
    the second cylindrical member is provided with a cut at substantially the position of each re-entrant seal.

6. In combination in a transducer,
    a first cylindrical member made from quartz and provided with a hollow interior and a particular axial length and with an axial bore defining the hollow interior,
    a second cylindrical member made from quartz and disposed within the axial bore in the first cylindrical member and having, at an intermediate portion along its axial length, a small spacing from an axial bore in the first cylindrical member,
    a first conductive layer fused to the axial bore of the first cylindrical member at the intermediate portion of the first cylindrical member, and
    a second conductive layer fused to the second cylindrical member at the intermediate portion of the second cylindrical member,
    the thickness of the first cylindrical member being tapered from a position near each end to a position near the intermediate portions of the first and second cylindrical members,
    the first and second cylindrical members being fused at the ends of the member along a length corresponding substantially to the lengths of the tapers in the thicknesses of the first cylindrical member.

* * * * *